Sept. 22, 1953  R. G. PIETY  2,652,720
METHOD OF AND APPARATUS FOR DETERMINING
TOTAL FLOW IN A BOREHOLE
Filed Nov. 15, 1948

INVENTOR.
R.G. PIETY
BY *Hudson & Young*
ATTORNEYS

Patented Sept. 22, 1953

2,652,720

UNITED STATES PATENT OFFICE 2,652,720

METHOD OF AND APPARATUS FOR DETERMINING TOTAL FLOW IN A BOREHOLE

Raymond G. Piety, Bartlesville, Okla., assignor to Phillips Petroleum Company, a corporation of Delaware Application November 15, 1948, Serial No. 60,096

5 Claims. (Cl. 73—155)

This invention relates to a method of and apparatus for determining total flow in a bore hole.

Heretofore, when flow meters or other similar devices have been used to measure flow rates at an inaccessible location, such as in a bore or drill hole, it has been assumed that the flow rate measured by the meter is substantially the same throughout the cross sectional area of the hole or other opening in which the flow occurs. In bore holes, where there is ordinarily little turbulence of the liquid, this assumption is not correct for the liquid velocity at the center of the hole is substantially greater than that at regions close to the sides of the hole. Accordingly, if the flow meter, which is ordinarily of substantially smaller size than the bore hole, is not centrally located, inaccurate or misleading readings are obtained.

It is an object of this invention to provide a method of and apparatus for measuring the total flow rate which is independent of the location of the flow meter with respect to the sides of the bore hole.

It is a further object to provide a method and apparatus whereby the flow meter is readily calibrated in a very short interval before each measurement in order to take into consideration discrepancies caused by the position of the flow meter with respect to the sides of the bore hole, variations in hole diameter, and other factors affecting the flow meter reading.

It is a still further object to provide apparatus which is rugged, durable, economical, and of simple construction.

Various other objects, advantages, and features of the invention will be apparent from the following detailed description, taken in conjunction with the accompanying drawings, in which.

Figure 1:
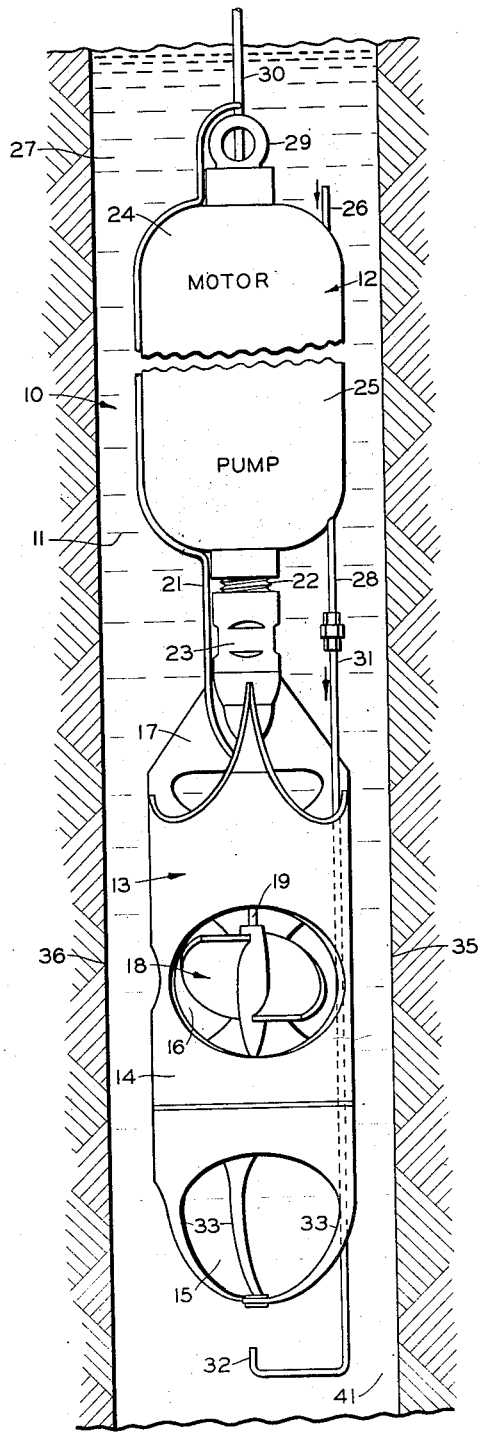
Figure 1 is a sectional view, partially in elevation, of my novel flow meter positioned within a bore hole.
Figure 3:
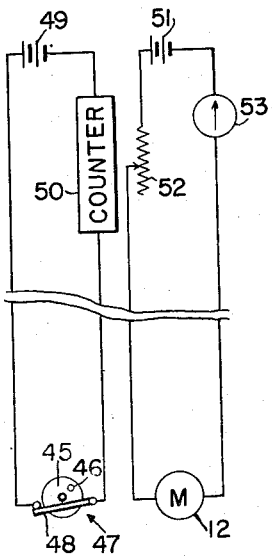
Figure 3 is a schematic view of the electrical circuitry employed in operating the flow meter.

Referring now to the drawings in detail, and particularly to Figure 1, I have shown the novel flow meter positioned within a bore hole 10 which is filled with liquid 11. The meter includes a combination motor and pump assembly 12 which is secured in any suitable manner to a flow meter 13 of conventional construction. In the described embodiment of the invention, the flow meter includes a casing 14 which is provided with a set of openings 15 at its lower end, a set of openings 16 at the middle of region thereof, and a set of openings 17 at its upper end. Passage of liquid in either direction through the flow meter causes rotary movement of spinner blades 18 which are carried by a shaft 19 journalled in any suitable manner within the casing 14. The speed of rotation of shaft 19 is, therefore, proportional to the flow velocity of the liquid passing therethrough, and this speed of rotation is measured by a suitable electrical contact device, not shown in Figure 1, which is connected to a counting device at the surface through electric cable 21. An electrical contact device which can be so employed is described in U. S. Patent No. 2,334,920, issued to J. E. Gosline et al. November 23, 1943. Such a speed indicating system is illustrated schematically in Figure 3 as comprising a rotatable disc 45 which has a small pin 46 attached near the periphery thereof. Disc 45 rotates with spinner blades 18. A normally closed switch 47 having a movable blade 48 is positioned adjacent disc 45 whereby pin 46 momentarily opens switch 47 once during each revolution of disc 45 by pressing against blade 48. A source of electrical energy 49 and a counter 50 are connected in series with blade 48 of switch 47 such that counter 50 registers the frequency of electrical pulses set up by the opening and closing of switch 47. Although the flow meter has been shown and described as one of the spinner type, it is to be understood that any type of flow meter may be used, such as a thermocouple type of flow meter, for example, substantially as described in U. S. Patent No. 2,197,818, issued to R. E. Tozier April 23, 1940.

The combination motor and pump unit 12 is secured to the flow meter by a screw threaded stud 22 which is received within a complementary bushing 23 formed at the upper end of the flow meter. This unit consists of a motor 24 operatively connected to a pump 25 in such fashion that a predetermined amount of liquid is withdrawn through an inlet 26 from the downstream end 27 of the flow meter, this liquid being discharged through an outlet 28. The motor and pump are both of conventional construction and, hence, it is not necessary that they be described in detail. The upper end of the motor casing is provided with a ring 29 so that the entire assembly may be raised and lowered within the bore hole by a cable 30. Motor 12 is connected in circuit with a source of electrical energy 51, a variable rheostat 52 and a current meter 53.

The liquid discharged from outlet 28 is fed through a conduit 31 to the upstream side of the flow meter 13 and the outlet portion 32 of conduit 31 is preferably positioned a substantial distance below the lower end of the flow meter so that the liquid discharged therefrom is distributed throughout the cross section of the bore hole in the same manner as the liquids normally flowing therethrough. In some cases, it may be desirable to provide a guard for the lower portion of conduit 31 and this may be readily accomplished by extending arms 33, which define the openings 15, downwardly a sufficient length as to protect the discharge portion 32 of conduit 31.

The operation of the described flow meter will now be apparent to those skilled in the art. The flow meter assembly is lowered by a cable 30 to a predetermined position in the bore hole at which it is desired to measure the total flow of liquid through the bore hole, and an uncorrected reading is taken of the observed rate of liquid flow. When positioned at this predetermined depth, the location of the flow meter with respect to the sides of the bore hole is unknown. Thus, for example, the meter may be positioned, as shown, closer to the wall 35 of the bore hole than to the wall 36. Alternatively, it may be positioned at the exact center of the bore hole or it may be disposed closer to wall 36 than to wall 35. In any case, the meter measures only the flow rate at the particular region of the cross section of the bore hole at which the casing 14 is located.

Figure 2:
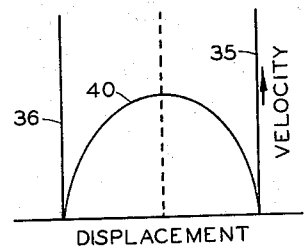
Figure 2 is a graph illustrating a feature of the invention.

Figure 2 is a graph showing the flow velocity at a vertical central plane cut through the bore hole 10, lines 35 and 36 representing, respectively, the sides of the bore hole in Figure 1. It will be noted from the curve 40 that the velocity is an approximately parabolic function of the distance from the center of the bore hole, the velocity being a maximum at the center of the bore hole and a minimum at the sides of the bore hole. The total flow rate, of course, is represented by the area under curve 40 or the integral of curve 40 taken from the line 35 to the line 36. This total flow, accordingly, represents an average value, and the measured flow, at a particular point in the well, may be either higher or lower than this average value. Thus, the flow meter reading varies with the distance of the meter from the sides of the hole which cannot be accurately determined. It will be apparent, therefore, that the conventional flow meter produces unreliable results unless the position of the meter with respect to the walls of the bore hole is definitely known.

In accordance with my invention, the reading of the flow meter is readily corrected to account for variations in position of the meter with respect to the sides of the bore hole as well as other factors, such as variations in hole diameter. To this end, after the flow meter is lowered to its desired location in the bore hole and a reading is taken, motor 24 is actuated by variance of rheostat 52 to operate pump 25, thereby causing a predetermined amount of liquid to flow from the outlet side 27 of the flow meter to the inlet side 41, this liquid being discharged through outlet 32. This predetermined amount of liquid is a function of the speed of rotation of motor 12 and the magnitude thereof can be obtained from a reading of meter 53. The flow of this predetermined additional amount of liquid produces a higher reading on the flow meter, which provides a correction factor to be applied to the original flow meter reading. For example, if the pump 25 causes an additional total flow through the bore hole of 5 gallons per hour and this causes an increase in the flow meter reading of 4 gallons per hour, it is known that the meter is so positioned with respect to the bore hole walls that each 5 gallons of total flow through the bore hole produces an indication of only 4 gallons per hour on the flow meter. Accordingly, the original meter reading taken before operation of pump 25 is initiated may be readily corrected to compensate for the location of the flow meter in the bore hole.

The meter may then be moved to a different location in the bore hole and a second reading may be taken. After this second reading, the pump 25 is again actuated to provide a correction factor for the second reading. If, for example, at the second location, operation of the pump to produce a flow increment of 5 gallons per hour causes the flow meter reading to increase 6 gallons per hour, it is then known that the second reading was too high, by a factor of 6 to 5, due to a decrease in the hole diameter below that assumed in calibrating the meter.

In summary, it will be noted that the pump 25 increases the total flow through the bore hole by a preselected amount, and this preselected increase causes a corresponding increase in the flow meter reading which, in general, does not have the same numerical value as the true flow increment. However, the ratio of the measured increment in flow to the known preselected increase in flow is the same as the ratio between the original measured flow and the true flow through the bore hole. Thus, the observed meter reading need only be multiplied by a readily determinable correction factor when each reading is taken to accurately reflect the total flow through the bore hole.

It will be apparent that my method of calibration corrects the flow meter calibration curve to conditions actually existing at the very region of the cross section of the bore hole at which the flow meter is positioned. The capacity of the pump 25 can ordinarily be regulated so that the implicit assumption, that the flow meter calibration is linear for the increment (or decrement) in flow introduced by the calibrating pump, can be proved to be a valid assumption. Differential flow rates are utilized in practically all cases when the object of the measurement is to determine the permeability profile of a well. In this important case my method of calibrating is most accurate. Finally, it will be noted that my method corrects not only for errors due to positioning of the flow meter with respect to the sides of the bore hole, but also to discrepancies caused by changes in the diameter of the bore hole, the size of the flow meter in comparison to the diameter of the drill hole, the nature of the flow as to turbulence, and the variation of flow rate across the section of the bore hole resulting from factors other than those caused by lamellar flow.

While the invention has been described in connection with a present, preferred embodiment thereof, it is to be understood that this description is illustrative only and is not intended to limit the invention, the scope of which is defined by the appended claims.

Having described my invention, I claim:

1. The method of determining total flow in a bore hole wherein the flow rate varies at different regions of the cross section of said bore hole which comprises lowering a flow meter into a bore hole to a predetermined depth, whereby the flow meter indicates the amount of liquid passing from one end of the flow meter to the other end thereof, the flow meter thereby measuring the flow at an unknown region of the cross section of said bore hole, pumping a predetermined amount of liquid from said other end of the flow meter to said one end of the flow meter, and measuring the increased flow at said region, whereby the ratio of the measured increment in flow at said region to the predetermined amount of increase in flow is the same as the ratio between the original measured flow at said region and the true flow through the bore hole and the normal meter reading may be corrected accordingly to give the true flow.

2. A meter for measuring total flow in a bore hole which comprises, in combination, a flow meter for indicating the flow rate at a region of the cross section of a bore hole, a combination motor and pump unit attached to said flow meter, means for intermittently actuating said motor, said pump being adapted to produce a predetermined increment in the flow of liquid through said meter when actuated by said motor, whereby the ratio of the measured increment in flow at said meter to said predetermined increment in flow is the same as the ratio between the measured flow less said incremental flow at said meter and the true flow through the bore hole.

3. Apparatus for determining the total flow in a bore hole which comprises, in combination, a flow meter for indicating the flow rate at a region of the cross section of a bore hole, a combination pump and motor assembly attached to said meter, means for intermittently actuating said motor to pump a predetermined amount of liquid from the downstream side of said meter to the upstream side thereof, and a conduit for discharging said pumped liquid a substantial distance from the upstream side of the flow meter, whereby the ratio of the measured predetermined amount of increment in flow at said region to the true increase in flow resulting from operation of said pump is the same as the ratio between the measured flow at said region without said predetermined amount of increment and the true flow through the bore hole.

4. The method of determining total flow in a bore hole wherein the flow rate varies at different regions of the cross section of said bore hole which comprises lowering a flow meter into a bore hole to a predetermined depth, whereby the flow meter indicates the amount of liquid passing from the upstream side thereof to the downstream side thereof, pumping a predetermined amount of liquid from one end of the flow meter to the other end thereof and measuring the resulting changed flow at said region whereby the ratio of the change in measured flow at said region to the predetermined amount of liquid pumped past the meter is the same as the ratio between the original measured flow at said region and the true flow through the bore hole and the normal meter reading may be corrected accordingly to give the true flow.

5. Apparatus for determining the total flow in a bore hole which comprises, in combination, a flow meter for indicating the flow rate at a region of the cross section of a bore hole, a combination pump and motor assembly attached to said meter, a conduit extending from one side of said meter to the other side thereof, the end of said conduit on the upstream side of said meter being positioned a substantial distance from said meter, and means for intermittently actuating said motor to pump a predetermined amount of liquid from one side of said meter to the other side thereof through said conduit, whereby the ratio of the resulting measured change in flow at said region to the predetermined amount of liquid pumped is the same as the ratio between the measured flow at said region before the predetermined change of flow and the true flow through the bore hole.

RAYMOND G. PIETY.

References Cited in the file of this patent

UNITED STATES PATENTS

| Number | Name | Date |
|---|---|---|
| 2,379,138 | Fitting, Jr., et al. | June 26, 1945 |